United States Patent
Madasu et al.

(10) Patent No.: US 11,441,404 B2
(45) Date of Patent: Sep. 13, 2022

(54) RECURRENT NEURAL NETWORK MODEL FOR BOTTOMHOLE PRESSURE AND TEMPERATURE IN STEPDOWN ANALYSIS

(71) Applicant: Landmark Graphics Corporation, Houston, TX (US)

(72) Inventors: Srinath Madasu, Houston, TX (US); Yogendra Narayan Pandey, Houston, TX (US); Keshava Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 57 days.

(21) Appl. No.: 17/043,129

(22) PCT Filed: Apr. 12, 2018

(86) PCT No.: PCT/US2018/027341
§ 371 (c)(1),
(2) Date: Sep. 29, 2020

(87) PCT Pub. No.: WO2019/199313
PCT Pub. Date: Oct. 17, 2019

(65) Prior Publication Data
US 2021/0017845 A1 Jan. 21, 2021

(51) Int. Cl.
*E21B 43/26* (2006.01)
*E21B 47/06* (2012.01)
(Continued)

(52) U.S. Cl.
CPC ........... *E21B 43/26* (2013.01); *E21B 47/06* (2013.01); *G06N 3/0445* (2013.01); *G06N 3/063* (2013.01)

(58) Field of Classification Search
CPC ............................ E21B 43/26; E21B 2200/22
See application file for complete search history.

(56) References Cited

U.S. PATENT DOCUMENTS 6,795,773 B2 * 9/2004 Soliman ................. E21B 43/26
166/250.1
9,256,701 B2 * 2/2016 Chen ....................... G06F 30/20
(Continued)

FOREIGN PATENT DOCUMENTS

| WO | 2017/007464 A1 | 1/2017 |
| WO | 2017007464 A1 | 1/2017 |
| WO | 2017014732 A1 | 1/2017 |

OTHER PUBLICATIONS

International Search Report and Written Opinion for PCT application PCT/US2018/027341 dated Jan. 9, 2019, 10 pages.
(Continued)

*Primary Examiner* — Kenneth L Thompson
(74) *Attorney, Agent, or Firm* — Kilpatrick Townsend & Stockton LLP (57) ABSTRACT

A method for fracturing a formation is provided. Real-time fracturing data is acquired from a well bore during fracturing operation. The real-time fracturing data is processed using a recurrent neural network trained using historical data from analogous wells. A real-time response variable prediction is determined using the processed real-time fracturing data. Fracturing parameters for the fracturing operation are adjusted in real-time based on the real-time response variable prediction. The fracturing operation is performed using the fracturing parameters that were adjusted based on the real-time response variable prediction.

13 Claims, 6 Drawing Sheets

(51) Int. Cl.
    *G06N 3/04*        (2006.01)
    *G06N 3/063*       (2006.01)

(56) References Cited

U.S. PATENT DOCUMENTS

| | | | | |
|---|---|---|---|---|
| 9,262,713 | B2 * | 2/2016 | Shelley | E21B 43/26 |
| 10,364,662 | B1 * | 7/2019 | Basu | G06N 20/00 |
| 10,385,686 | B2 * | 8/2019 | James | E21B 43/26 |
| 10,400,550 | B2 * | 9/2019 | Gu | E21B 41/0092 |
| 10,711,604 | B2 * | 7/2020 | Johnson | E21B 43/26 |
| 11,151,454 | B2 * | 10/2021 | Madasu | E21B 43/26 |
| 2003/0050758 | A1 | 3/2003 | Soliman et al. | |
| 2009/0084545 | A1 | 4/2009 | Banerjee et al. | |
| 2009/0182694 | A1 * | 7/2009 | Boulatsel | E21B 43/26 |
| | | | | 706/19 |
| 2018/0018558 | A1 | 1/2018 | Lee et al. | |
| 2020/0065677 | A1 * | 2/2020 | Iriarte Lopez | G06N 3/084 |

OTHER PUBLICATIONS

Examination report issued in corresponding CA application No. 3,092,663, dated Sep. 21, 2021.

* cited by examiner

RECURRENT NEURAL NETWORK MODEL FOR BOTTOMHOLE PRESSURE AND TEMPERATURE IN STEPDOWN ANALYSIS

TECHNICAL FIELD OF THE INVENTION

The embodiments disclosed herein generally relate to hydraulic fracturing operations, and, more particularly, to use of a recurrent neural network model for predicting bottomhole pressure and temperature in stepdown analysis.

BACKGROUND OF THE INVENTION

Hydrocarbon-producing wells are often stimulated by hydraulic fracturing treatments. Numerous difficulties exist in the current art of hydraulic fracture treatments and the major physics and engineering aspects that are involved are very complicated. Quite often obtained data comes with significant uncertainty. A stepdown analysis is thus performed as part of a hydraulic fracturing treatment to estimate certain response variables, such as bottomhole pressure and temperature. However, current approaches for predicting stepdown analysis response variables often demand shutting down a well, which is typically not cost-efficient.

What is needed, therefore, is a dynamic real time approach for estimating the response variables in stepdown analysis that can be performed without shutting down the well.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The term "uphole" as used herein means along the drill string or the hole from the distal end towards the surface, and "downhole" or "bottomhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

Hydraulic fracturing operations generally involve pumping a fracturing fluid into a well bore that penetrates a subterranean formation at a hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. After at least one fracture is created and the proppant particulates are substantially in place, the fracturing fluid may be "broken" (i.e., the viscosity of the fluid is reduced), and the fracturing fluid may be recovered from the formation.

Data collected during the hydraulic fracturing treatments includes real time data captured with each operational stage, such as surface pressure, fluid pumping rate, and proppant concentration. Embodiments of the present invention provide an analytics computing platform that employs a novel machine learning model based on deep recurrent neural network (deep RNN) for estimating response variables (e.g., bottomhole pressure and temperature) that are utilized in stepdown analysis. The disclosed novel model combines the collected data with machine learning capabilities to resolve time and spatial variation of the response variables. Advantageously, the disclosed analytics computing platform is capable of predicting, in real time, a response variable during a pumping stage of the treatment operation by employing memory-preserving RNN variants, as discussed below. As yet another advantage, the disclosed model may be used to perform stepdown analysis of data related to actual hydraulic fracturing treatments (e.g., pressure, slurry rate, and proppant concentration) and estimates response variables without shutting the well down to estimate perforation and tortuosity friction. The described model eliminates the need for downhole sensors for subsequent runs associated with analogous wells once the model is trained for a single well. Estimates of reservoir pressure can also be formed for reservoir simulators by the disclosed model.

As noted above, hydraulic fracturing is a method of extracting hydrocarbons from earth formations in which thousands of gallons of a fracturing fluid, generally water, proppants, and other chemicals, are injected into a wellbore and a surrounding earth formation. The high pressure creates fractures in the earth formation, along which hydrocarbons, such as gas and petroleum, may flow to the wellbore and collected therefrom. However, this basic hydraulic fracturing method is unable to extract a maximum amount of hydrocarbons. Generally, after an initial fracturing operation, continued pumping and injection of more fluid causes deepening and widening of the fissures.

In planning and executing a hydraulic fracturing operation, the prediction of certain response variables, such as downhole pressure and/or expected long-term static downhole temperature, is very important in estimating fracture geometry and near wellbore friction such as perforation and tortuosity friction. A stepdown analysis is thus often performed to estimate these response variables. However, existing approaches require the well to be shut down as part of the analysis. Advantageously, the disclosed RNN-based model can be used with the stepdown analysis without shutting the well, hence, saving costs associated with the shutdown. According to an embodiment of the present invention, collected data is passed to a deep RNN, such as, for example, a long short-term memory (LSTM) recurrent neural network, to perform response variable prediction in a fracturing operation. The disclosed embodiments take into account commonly known surface variables to capture the underlying dynamics of the well. This, together with the use of the RNN-based model, allows the embodiments of the present invention to thereby provide a predictive system that achieves higher accuracy with a smaller data set than conventional predictive systems.

The disclosed embodiments can also overcome other limitations of existing approaches to predicting stepdown analysis response variables. One of the limitations of the currently known methods of predicting response variables is that the produced estimations are not in high resolution. Moreover, these known methods are not capable of handling a high level of non-linearity in the downhole pressure/temperature time series in real time. This high level of non-linearity exists because downhole pressure is predicted in these methods based upon friction models which are not accurate since these models are generated using laboratory data.

In general, the modeling of non-linear and time-varying dynamic processes or systems from measured input data is hard due to the highly non-linear nature of the variable interrelationships and because such modeling requires filtering of noisy dynamic variables. Embodiments herein provide end-to-end deep learning systems and methods for some dynamic variable analysis to address the aforementioned problems. However—and as will now be readily appreciated by those skilled in the art—selecting a best data layout for a model is not a trivial problem, especially for a deep learning algorithm which uses multi-dimensional arrays. Also, multi-step prediction problems cause the optimization problem to grow exponentially with the prediction horizon. A "prediction horizon" is understood to be the number of sampling steps being tracked in the future. The embodiments of the present invention include a method for dynamic variable value predictions based on data mining on spatial-temporal correlations. These predictions may be used to adjust fracturing parameters in the hydraulic fracturing operation in real time, subject to override by an operator.

To solve some of the above problems, the disclosed embodiments use a RNN-based model represented by respective prediction function to formulate a potentially predictive relationship between a response variable and predictor variables. This relationship may be formed by training the predictive model using appropriate training data.

As mentioned above, the RNN-based model may use a multivariate deep RNN. RNNs have the benefit of being able to handle additional features and side information without data fragmentation and also provide better performance compared to other solutions. In various embodiments, the prediction model may be implemented as a long short-term memory RNN (LSTM-RNN) or as a gated recurrent unit RNN (GRU-RNN). In one embodiment, the RNN implemented model is trained based on predefined segments of multi-stage treatment data. Other segments of treatment data may be used for simultaneous validation of the trained model. The data not used during training and validation steps may be designated as "hold-out" test data. Such data may be used for quantifying trained model efficacy. In one embodiment, the recurrent neural network may be trained using historical data from analogous wells.

Figure 1A:
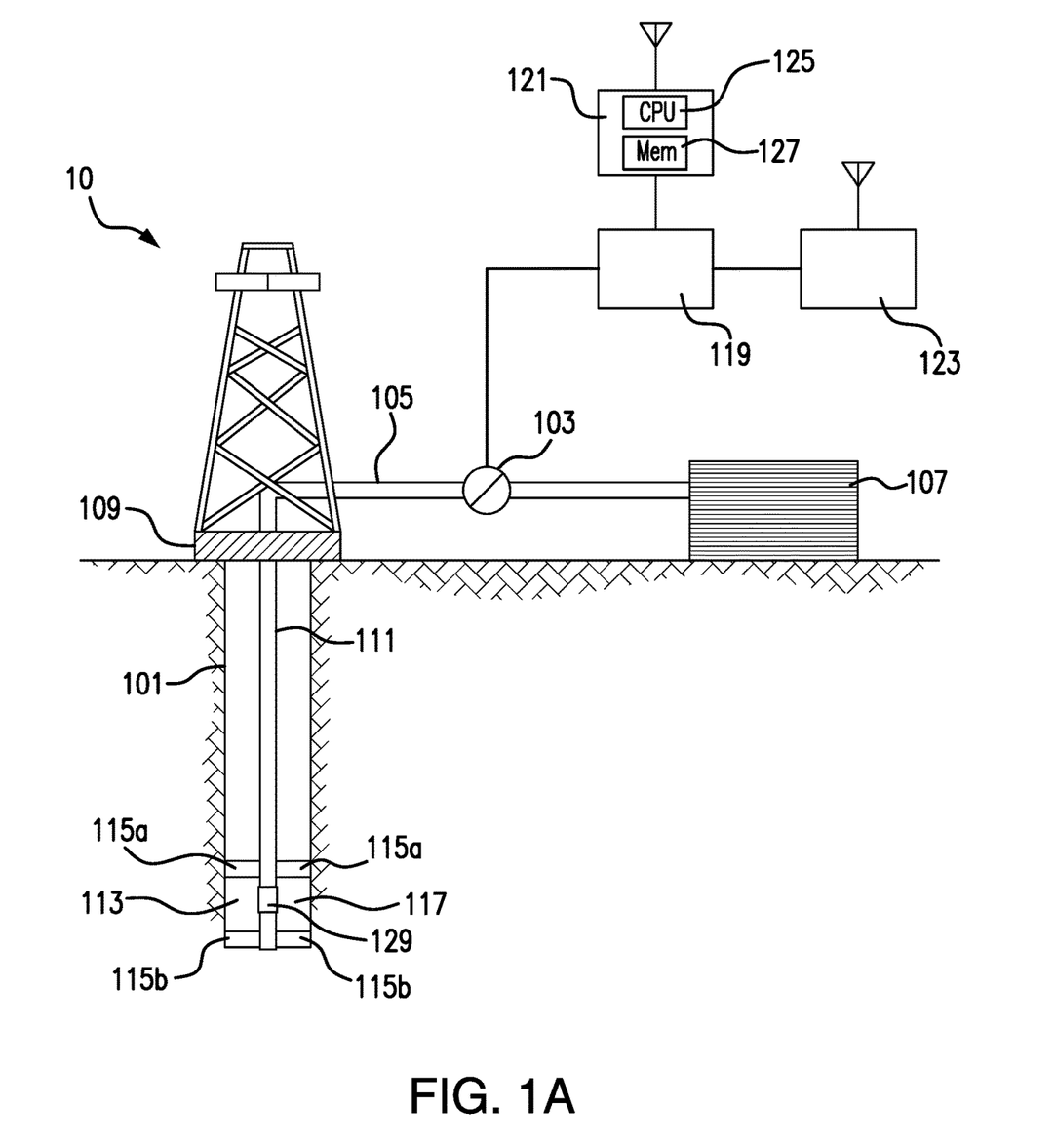
FIG. 1A shows an example system architecture of a hydraulic fracturing system according to an embodiment of the present disclosure.

FIG. 1A depicts a schematic view of a hydraulic fracturing system 10 for fracturing a formation utilizing a below-described model. While FIG. 1 depicts a land-based system, it is to be recognized that like systems may also be operated in offshore locations for subsea wells.

Although shown as vertical, the wellbore 101 may include horizontal, vertical deviating to horizontal, slant, curved, and other types of wellbore geometries and orientations, and the fracturing fluid may be applied to a subterranean zone surrounding any portion of the wellbore. The wellbore 101 can include a casing that is cemented or otherwise secured to the wellbore wall. The wellbore 101 can be uncased or include uncased sections. In cased wells, perforations can be formed using shape charges, a perforating gun, hydro-jetting and/or other tools.

In one or more embodiments, the hydraulic fracturing system 10 can be configured for delivering the fracturing fluids to a downhole location. In various embodiments, the hydraulic fracturing system 10 can comprise a pump 103 that is fluidly coupled to line 105 which is used to transport fracturing fluid from a mixing/storage tank 107 to the wellhead 109, where the fracturing fluid enters working string 111 which extends from the wellhead 109 to the desired treatment zone 113. As used herein, the term "treatment zone" is used to refer to an interval of rock along a wellbore into which fracturing fluid is directed to flow from the wellbore.

In one or more embodiments, the mixing/storage tank 107 can be used to formulate the fracturing fluid. In various embodiments, the pump 103 (e.g., a low pressure pump, a high pressure pump, or a combination thereof) may convey the fracturing fluid from the mixing tank 107 to the working string 111. The fracturing fluid may also be formulated offsite and transported to a worksite, in which case the fracturing fluid may be introduced to the working string via the pump 103 directly from its shipping container (e.g., a truck, a railcar, a barge, or the like) or from a transport pipeline. In either case, the fracturing fluid may be drawn into the pump 103, elevated to an appropriate pressure, and then introduced into the working string for delivery downhole.

In one or more embodiments, the pump 103 may be a high pressure pump. As used herein, the term "high pressure pump" will refer to a pump that is capable of delivering a fluid downhole at a pressure of about 1000 psi or greater. A high pressure pump may be used when it is desired to introduce the fracturing fluid to a treatment zone at or above a fracture gradient of the subterranean formation, but it may also be used in cases where fracturing is not desired. In one or more embodiments, the high pressure pump may be capable of fluidly conveying particulate matter, such as proppant particulates, into the treatment zone. Suitable high pressure pumps will be known to one having ordinary skill in the art and may include, but are not limited to, floating piston pumps and positive displacement pumps.

In one or more embodiments, the pump may be a low pressure pump. As used herein, the term "low pressure pump" will refer to a pump that operates at a pressure of about 1000 psi or less. In one or more embodiments, a low pressure pump may be fluidly coupled to a high pressure pump that is fluidly coupled to the working string 111. That is, in such embodiments, the low pressure pump may be configured to convey the fracturing fluid to the high pressure pump. In such embodiments, the low pressure pump may "step up" the pressure of the fracturing fluid before it reaches the high pressure pump.

The working string 111 may comprise coiled tubing, jointed pipe, and/or other structures that allow fluid to flow into the wellbore 101. The working string 111 may further include flow control devices (not shown) that control the flow of fluid from the interior of the working string 111 into the treatment zone 113.

In one or more embodiments, the working string 111 and/or the wellbore 101 may include one or more sets of packers 115a, 115b that seal the annulus between the working string 111 and wellbore 101 to define an interval of the wellbore into which fracturing fluid will be pumped. As illustrated, the fracturing system can comprise two sets of packers 115a and 115b, one defining an uphole boundary and one defining a downhole boundary. When the fracturing fluid is introduced into wellbore at a sufficient hydraulic pressure, one or more fractures 117 may be created in the treatment zone. The proppant particulates in the fracturing fluid may enter the fractures 117 where they may remain after the fracturing fluid flows out of the wellbore 101. These proppant particulates may prop fractures such that fluids may flow more freely through the fractures 117.

The methods and compositions of the embodiments may be suitable for use in nearly all subterranean formations. However, in one or more embodiments the fracturing fluid may be particularly well suited for use in a formation with water-sensitive clay formations, including smectite, vermiculite, illite, kaolinite, chlorite, and mixed-layer smectite-illite.

It is to be recognized that the system depicted in FIG. 1A is merely exemplary in nature and that various additional components may be present that have not necessarily been depicted in the interest of clarity. For example, a downhole tool having a tool body 129 can be employed in the wellbore 101 with an appropriate conveyance system, such as "wireline" systems, in order to carry out data collection operations. The tool body 129 may be lowered into the wellbore 101 by wireline conveyance (not shown in FIG. 1A). The tool body 129 which may contain sensors (e.g., temperature sensors, pressure sensors, humidity sensors, etc.) or other tools and instrumentation for detecting and logging nearby characteristics and conditions of the wellbore and surrounding formation. The wireline conveyance can be anchored in the pump 103 or portable means such as a truck. The wireline conveyance can include one or more wires, slicklines, cables, or the like, as well as tubular conveyances such as coiled tubing, joint tubing, or other tubulars.

The wireline conveyance provides support for the tool, as well as enabling communication between the tool processors on the surface and providing a power supply. The wireline conveyance can include fiber optic cabling for carrying out communications. The wireline conveyance is sufficiently strong and flexible to tether the tool body through the wellbore 101, while also permitting communication through the wireline conveyance to local processor 119 and/or remote processors 121, 123. Additionally, power can be supplied via the wireline conveyance to meet power requirements of the tool. For slickline or coiled tubing configurations, power can be supplied downhole with a battery or via a downhole generator.

Exemplary one or more processor(s) 119-123 may include a processing unit (CPU) 125 and a system bus that couples various system components including a system memory 127 such as read only memory (ROM) and random access memory (RAM) to the processor(s) 119-123. The processor(s) 119-123 can include a cache of high-speed memory connected directly with, in close proximity to, or integrated as part of the processor(s) 119-123. These and other modules can control or be configured to control the processor(s) 119-123 via a plurality of instructions to perform various operations or actions described below. Other system memory may be available for use as well. The memory 127 can include multiple different types of memory with different performance characteristics. For economy of the description, only the CPU 125 and system memory 127 of the processor 121 is explicitly shown in FIG. 1A. (continue here)

Figure 1B:
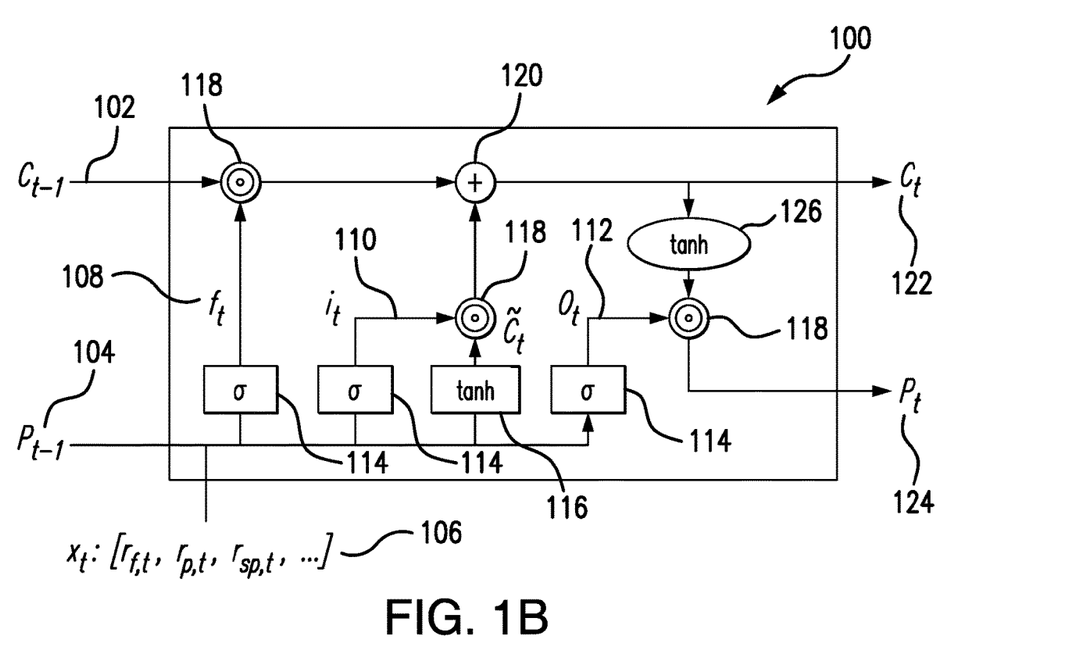
FIG. 1B shows an example long short-term memory (LSTM) memory block, in accordance with an embodiment of the present disclosure.

FIG. 1B shows an example long short-term memory (LSTM) memory block 100, in accordance with an embodiment of the present invention that may be employed by the local processor 119 and/or remote processors 121, 123 to predict response variables in connection with the hydraulic fracturing system 10 of FIG. 1A. Each LSTM memory block 100 can include one or more LSTM memory cells and each LSTM memory cell can generate a cell output that is aggregated to generate the LSTM output for a time step. In the schematic representation, cell inputs $C_{t-1}$ 102 and $P_{t-1}$ 104 are cell state and response variable output from the previous time step, respectively. Cell input $x_t$ 106 is a multivariate input for the current time-step, which includes fluid rate $(r_{f, t})$, surface pressure $(r_{sp, t})$ and proppant rate $(r_{p, t})$. The multivariate input 106 may be obtained from the current and previous time steps within a predefined look-up window of the LSTM block 100. The multivariate input 106 (i.e., the fluid rate, surface pressure, and proppant rate) are independent variables that are functions of time and can be calculated before starting the fracturing treatment based upon the treatment design in the desired treatment zone 113. The LSTM cell 100 has 4 layers in some embodiments and the layers have weights and biases associated with them. The weights and biases are reflected in Equations (1)-(7) below. In these equations, each W term is a respective matrix of current weight values for the LSTM memory cell and $b_i$, $b_f$, $b_c$, and $b_o$ are bias vectors. These weights and biases are trained during the training process to provide optimal predictions of the bottomhole pressure/temperature parameters in the time series. In the equations, f, i, and o correspond to forget gate 108, input gate 110, and output gate 112. The input values 104 and 106 may then be mapped to a scalar range of [0, 1] by use e.g. of a sigmoid function 114, thus achieving values that define how much of the information of the time-series data should be passed from the previous time step to the next time step.

Following are mathematical representations of operations that may be performed by the LSTM cell 100 at the time step t to calculate the cell state and output $C_t$ 122 and $p_t$ 124.

Equation (1) below represents the multivariate input 106:

$$x_t = [r_{f,t}, r_{p,t}, r_{sp,t} \ldots]  \quad (1)$$

Equation (2) below represents the forget gate 108:

$$f_t = \sigma(W_f * [p_{t-1}, x_t] + b_f)  \quad (2)$$

Equation (3) below represents the input gate 110:

$$i_t = \sigma(W_i * [p_{t-1}, x_t] + b_i)  \quad (3)$$

Equation (4) below represents the intermediate cell state:

$$\check{C}_t = \tan h(W_C * [p_{t-1}, x_t] + b_C)  \quad (4)$$

Equation (5) below represents the resultant cell state 122:

$$C_t = f_t \odot C_{t-1} + i_t \odot \check{C}_t  \quad (5)$$

Equation (6) below represents the output gate 112:

$$o_t = \sigma(W_o * [p_{t-1}, x_t] + b_o)  \quad (6)$$

Equation (7) below represents the resultant output value of the response variable from the current time step:

$$p_t = o_t \odot \tan h(C_t)  \quad (7)$$

Still referring to FIG. 1B, the rectangular boxes 114 and 116 denote different layers within the LSTM cell 100, which have corresponding weights ($W_f$, $W_i$, $W_c$, and $W_o$) and biases ($b_f$, $b_i$, $b_c$, and $b_o$) associated therewith. The illustrated circle shapes 118, 120 and elliptical shape 126 represent mathematical operations of the Hadamard product (entrywise product), addition and the hyperbolic tangent function, respectively.

Figure 2:
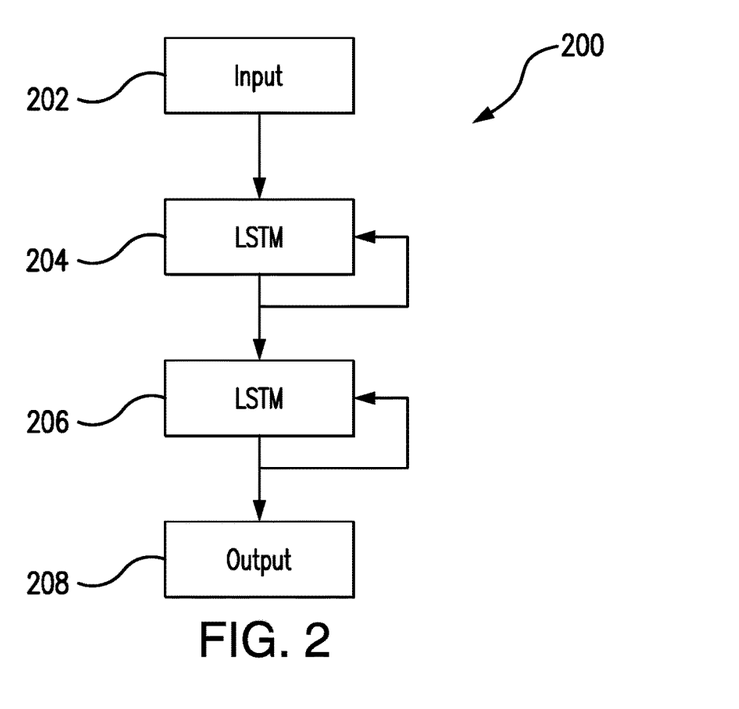
FIG. 2 is an example schematic depicting stacked LSTM cells constituting a deep recurrent neural network in accordance with an embodiment of the present disclosure.

FIG. 2 is an example high-level schematic depicting stacked LSTM cells, such as LSTM cell 100 of FIG. 1B, constituting at least a portion of a deep RNN (i.e., LSTM-RNN) 200 in accordance with an embodiment of the present disclosure. In the LSTM-RNN 200, a multivariate input 202 comprising obtained values of the independent variables mentioned above, which are function of time, is fed into a first LSTM cell 204. These values may be obtained and/or derived from downhole data acquired using, for example, the downhole tool 129 (see FIG. 1A) either in real time or from a suitable database of downhole data. The first LSTM cell 204 performs calculations described above in conjunction with FIG. 1B and sends produced output to a second LSTM cell 206 as well as back to itself. The second LSTM cell 206 also performs calculations based on the inputs provided by the first LSTM cell 204 to produce output comprising one or more optimal predictions of the response variable in the time series. The output of the second LSTM cell 206 is then provided to the next LSTM cell (not expressly shown) as well as back to the second LSTM cell 206 itself, and so on. The output of the last LSTM cell, in this example the second LSTM cell 206, comprises the final output 208 of the entire deep RNN 200 shown in FIG. 2. For the sake of simplicity a stack of only two LSTM cells 204-206 are shown in the illustrated RNN 200. However, various embodiments of the present invention are not so limited and the disclosed RNN may include any number of stacked LSTM cells.

Figure 3:
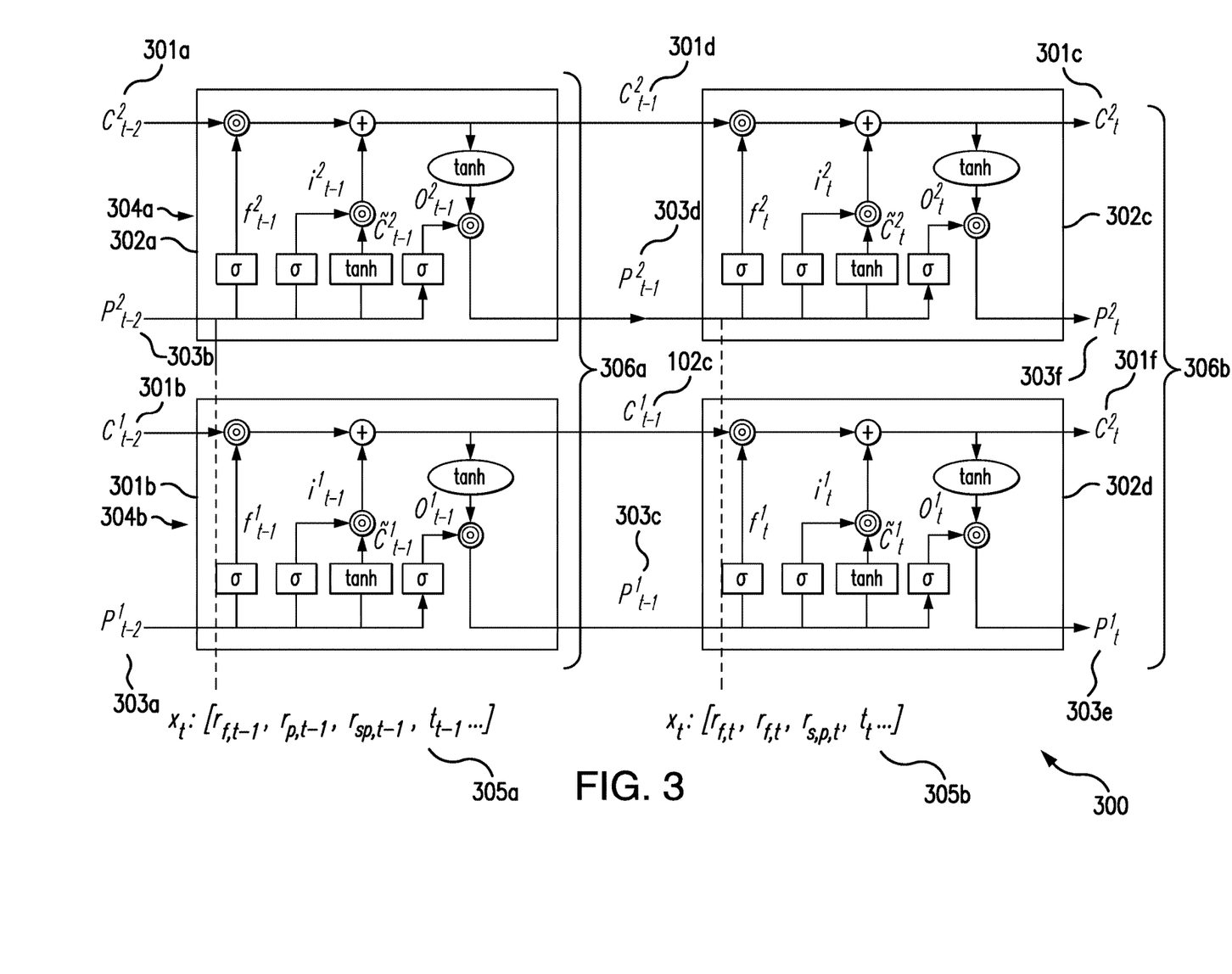
FIG. 3 depicts an example schematic representation of connections in stacked LSTM cells constituting a deep recurrent neural network in accordance with an embodiment of the present disclosure.

FIG. 3 depicts an example schematic representation of connections in stacked LSTM cells constituting at least a portion of a deep RNN (i.e., LSTM-RNN) 300 in accordance with an embodiment of the present invention. The particular LSTM-RNN 300 in FIG. 3 includes four stacked LSTM cells 302a, 302b, 302c, and 302d arranged in two horizontal layers or rows 304a and 304b and two vertical sections 306a and 306b. In FIG. 3, $p_t$ represents a response variable (such as bottomhole pressure/temperature) at various time steps. More specifically, $p^1_{t-2}$ 104a and $p^2_{t-2}$ 104b represent response variable values at time step t-2, $p^1_{t-1}$ 104c and $p^2_{t-1}$ 104d represent response variable values at time step t-1, and $p^1_t$ 104e and $p^2_t$ 104f represent response variable values at time step t. The input x 106 is a multivariate input that is passed to the deep LSTM RNN to perform variable prediction and capturing the underlying dynamics of the system. The present embodiments thereby provide a predictive system that has been observed to achieve higher accuracy than conventional predictive systems. In the embodiment shown in FIG. 3, the input x 106 includes fluid rate ($r_f$), surface pressure ($r_{sp,t}$), and proppant rate ($r_p$) and is shared by the stacked layers 304a and 304b. Each horizontal row 304a, 304b of the LSTM cells 302a, 302b represents a deep RNN layer, and each vertical section 306a, 306b represents an individual time step.

According to an embodiment of the present invention, the cell state C 102 and the generated predicted output (variable p 104) from an individual layer 304a, 304b in the deep RNN 300 is passed on to the next step in the same layer and provides the basis for input formulation at the next time step. In other words, the cell states $c^1_{t-1}$ 102c and $c^2_{t-1}$ 102d and the generated predicted variable output $p^1_{t-1}$ 104c and $p^2_{t-1}$ 104d are passed from cells 302a and 302b to respective cells 302c and 302d in the same layers 304a and 304b. Final value of the response variable p (e.g., bottomhole pressure/variable) is obtained by combining the predicted variable outputs $p^1_t$ 104e and $p^2_t$ 104f from all stacked layers 304a-304b at the last time step 306b. In various embodiments, the respective outputs may be combined using either root-mean-square error loss and/or BPTT (back propagation through time) methods known in the art, among others.

Thus, as can be seen from the foregoing, a deep learning RNN-based prediction model, such as the stacked LSTM model described above or other variants of deep RNN (depending on implementation), helps capture highly non-linear variations in the time-series data. This property of the disclosed deep learning based prediction model makes it particularly suited for use in real-time prediction of downhole pressure based on information collected during multi-stage hydraulic fracturing, given the highly non-linear nature of the pressure response time series. Further, in various embodiments of the present invention, a sufficiently trained deep RNN is used for stepdown analysis for generating a predicted downhole pressure value in real time at different steps of fracturing fluid flow rates going from a finite value to zero. The estimated downhole pressure may be further used to perform analysis so that the total number of open perforations and tortuosity friction near a wellbore can be determined or modeled.

Figure 4:
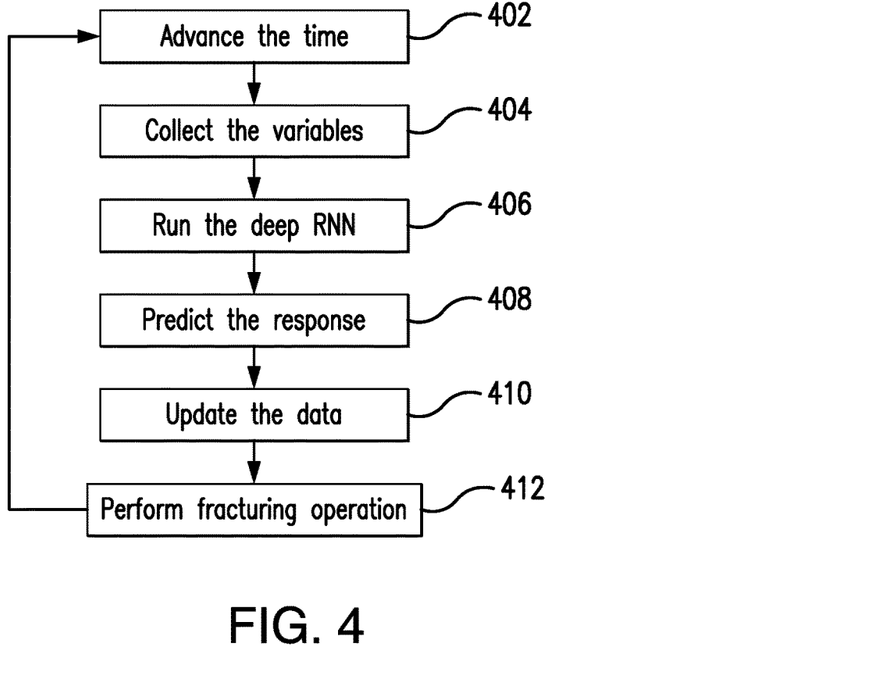
FIG. 4 is an example flow diagram for calculation of a response variable, in accordance with an embodiment of the present disclosure.

FIG. 4 is a flow diagram for a stepdown analysis method that may be employed by the local processor 119 and/or remote processors 121, 123 to predict response variables in connection with the hydraulic fracturing system 10 of FIG. 1A, in accordance with an embodiment of the present invention. Before turning to description of FIG. 4, it is noted that the flow diagram in this figure shows examples in which operational steps are carried out in a particular order, as indicated by the lines connecting the blocks, but the various steps shown in these diagrams can be performed in a different order, or in any combination or sub-combination of shown steps. It should be appreciated that in some embodiments some of the steps described below may be combined into a single step. In some embodiments, one or more additional steps may be performed. As will be appreciated by one skilled in the art, aspects of the present invention may be embodied as a method or computer program product.

The hydraulic fracturing process is typically performed in a coordinated fashion, stage by stage, and zone by zone, until all of the zones have been fractured. For each stage the stepdown analysis may be performed by observing changes in response variable values over time. The stepdown analysis includes a sequence of steps that are repeated continuously for each analyzed interval of time. The processor 119 starts the disclosed stepdown analysis at step 402 by advancing time to next time interval. At step, 404, the processor 119 obtains the multivariate input for the current time-step (time interval), which includes fluid rate, surface pressure and proppant rate in one embodiment. These values may be obtained and/or derived from downhole data acquired using, for example, the downhole tool 129 (see FIG. 1A).

According to an embodiment of the present invention, at step 406, the processor 119 runs the deep RNN 300 using at least a portion of the obtained multivariate input as an input to the deep RNN 300. In other words, all layers 304a-304b of the deep RNN 300 perform calculations to generate output 102-104 for this particular time step (e.g., a first time step) based on the values of input variables 106a, as described above. At step 408, the processor 119 predicts the response variable using the deep RNN 300. In one embodiment, this step involves combining the predicted variable outputs $p^1_{t-1}$ 104c and $p^2_{t-1}$ 104d for the corresponding time step. Next, at step 410, the processor 119 updates/adjusts the hydraulic fracturing parameters utilized by the hydraulic fracturing system 10. At step 412, the hydraulic fracturing system 10 performs the fracturing operation for a particular zone as described above using the fracturing parameters that were adjusted based on the real-time response variable prediction. Once the updated data for a corresponding time step is transmitted to the hydraulic fracturing system 10, the processor 119 goes back to step 402 to advance the time and to repeat steps 404-410 for the next time step (e.g., a second time step).

Figure 5A:
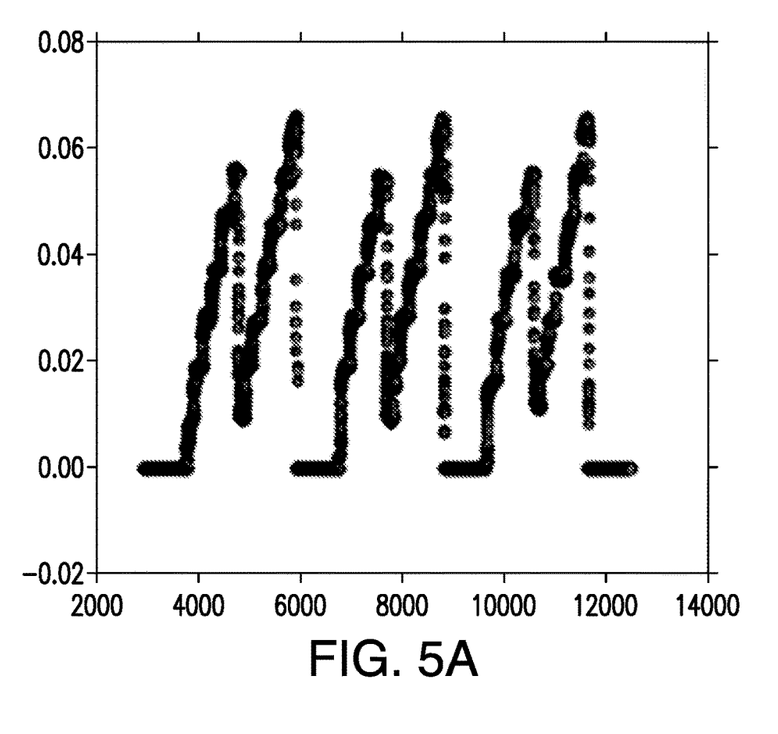
FIGS. 5A-5D show exemplary input data that may be used by the disclosed deep recurrent neural network based model.
Figure 5B:
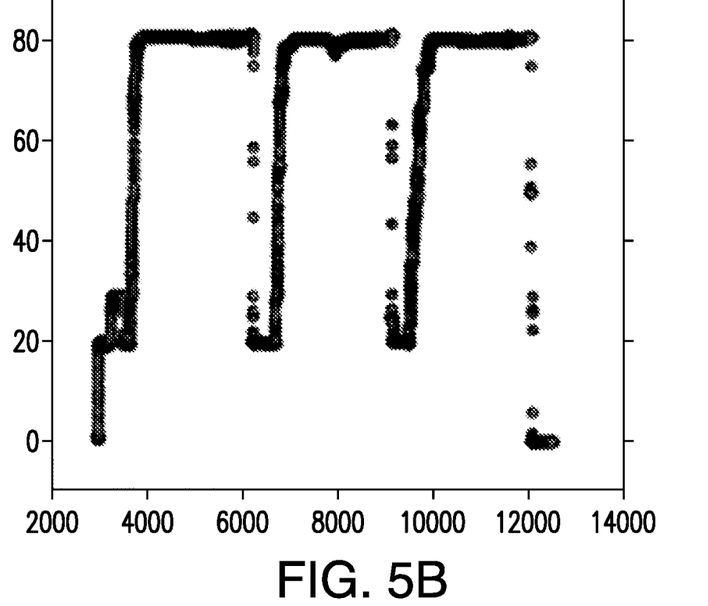
Figure 5C:
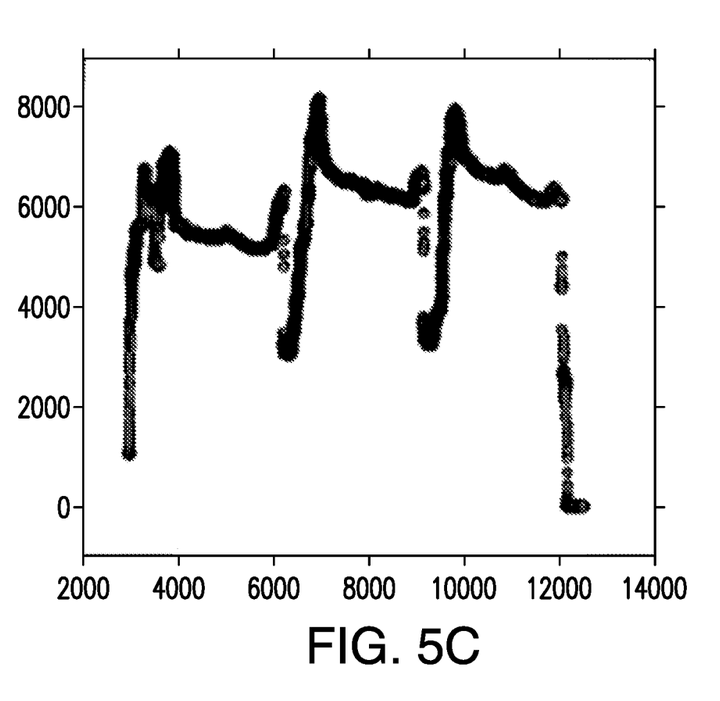
Figure 5D:
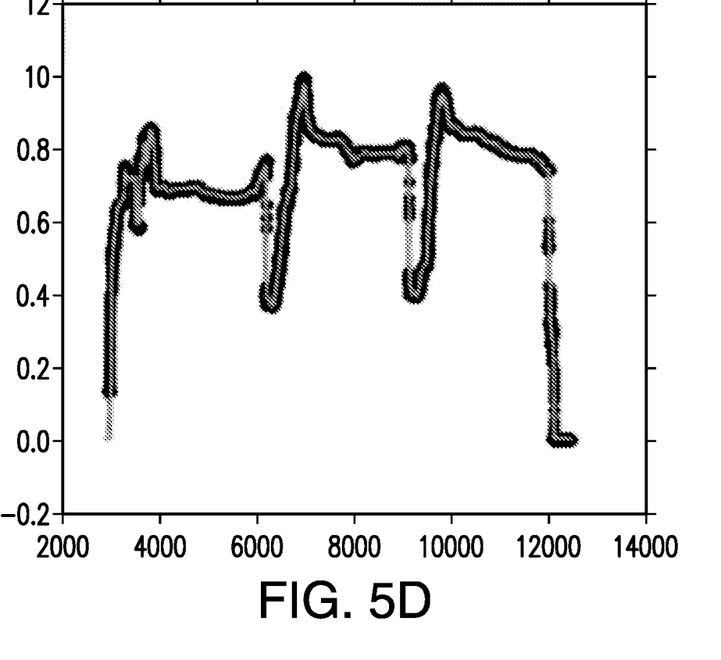

FIGS. 5A-5D show exemplary input data that may be used by the disclosed deep RNN based model. More specifically, FIG. 5A shows a plot of exemplary observed proppant rate ($r_p$) in the formation (plotted on a vertical axis) as a function of time (plotted on a horizontal axis). FIG. 5B is a graph showing exemplary observed fluid rate ($r_f$) (plotted on a vertical axis) as a function of time (plotted on a horizontal axis). The fluid rate has been monitored by automatically recording the fluid rate over time, during fracturing operation as fracturing fluid had been introduced into the monitored wellbore. FIG. 5C is a graph showing exemplary observed treating pressure (surface pressure ($r_{sp,t}$)) plotted over time. FIG. 5D illustrates the observed downhole pressure plotted over time. In FIGS. 5C and 5D, the vertical axis of each graph is pressure measured in psi, and the horizontal axis is time measured in seconds.

Figure 6:
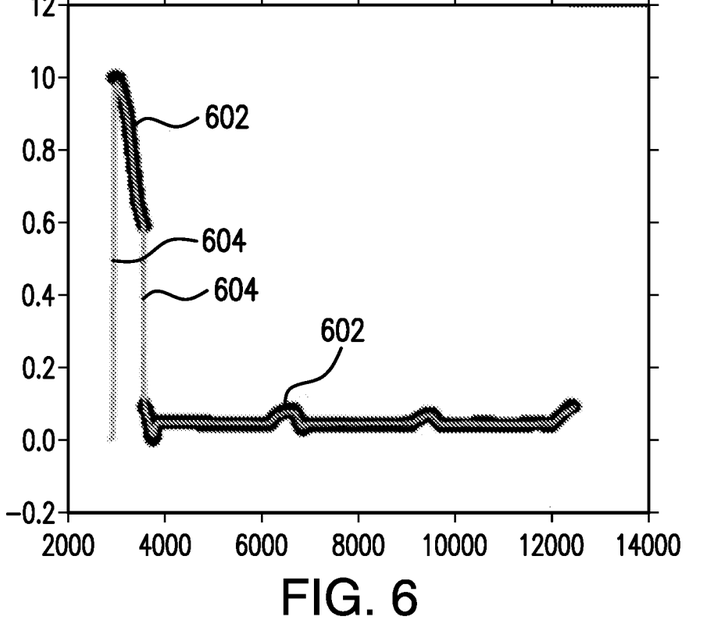
FIG. 6 shows comparison between predictions of response values made by the deep neural network model described in the embodiments of the present invention and actual response values.

FIG. 6 shows comparison between predictions made by the deep RNN-based model described in the embodiments of the present invention and actual response variable values. More specifically, FIG. 6 shows graphs of a change in downhole fluid temperature values over time. In FIG. 6, a first graph 602 shows predicted values, while a second graph 604 shows actual response values of downhole fluid temperatures.

Accordingly, as set forth above, the embodiments disclosed herein may be implemented in a number of ways. In general, in one aspect, the disclosed embodiments are directed to a method for fracturing a formation. The method includes, among other steps, the steps of (i) acquiring real-time fracturing data from a well bore during fracturing operation; (ii) processing the real-time fracturing data using a recurrent neural network trained using historical data from analogous wells; (iii) determining a real-time response variable prediction using the processed real-time fracturing data; (iv) adjusting fracturing parameters for the fracturing operation in real-time based on the real-time response variable prediction; and (v) performing the fracturing operation using the fracturing parameters that were adjusted based on the real-time response variable prediction.

In one or more embodiments, the method for fracturing a formation may further include any one of the following features individually or any two or more of these features in combination: (a) the response variable including at least one of a bottomhole pressure of a well bore and temperature of the well bore; (b) the step of estimating at least one of a total number of open perforations in the well bore and tortuosity pressure drop in the well bore based on the determined real-time response variable; (c) the real-time drilling data including multidimensional spatial-temporal data; (d) the step of determining the real-time response variable prediction further including determining temporal correlations within the processed real-time fracturing data; and (e) the recurrent neural network including one or more long short-term memory (LSTM) layers. The one or more LSTM layers are arranged in a sequence. Each of the one or more LSTM layers is configured to perform operations including: (i) receiving a layer input, wherein the layer input is the real-time fracturing data or a layer output generated by a preceding LSTM layer in the sequence; (ii) generating an LSTM output based on the layer input and a previous projected output; and (iii) generating, by processing through the respective LSTM layer, a projected output by applying a matrix of current values of weights to project the LSTM output.

In general, in yet another aspect, the disclosed embodiments are related to a system for fracturing a formation. The system includes a downhole tool having a plurality of sensors thereon configured to acquire real-time fracturing data from a well bore. The system further includes a processor in data communication with the downhole tool and a memory device coupled to the processor. The memory device contains a set of instructions that, when executed by the processor, cause the processor to: (i) acquire real-time fracturing data from a well bore during fracturing operation; (ii) process the real-time fracturing data using a recurrent neural network trained using historical data from analogous wells; (iii) determine a real-time response variable prediction using the processed real-time fracturing data; and (iv) adjust fracturing parameters for the fracturing operation in real-time based on the real-time response variable prediction.

In one or more embodiments, the system for fracturing a formation may further include any of the following features individually or any two or more of these features in combination: (a) the response variable including at least one of a bottomhole pressure of a well bore and temperature of the well bore; (b) the set of instructions further causing the processor to estimate at least one of a total number of open perforations in the well bore and tortuosity pressure drop in the well bore based on the determined real-time response variable; (c) the real-time drilling data including multidimensional spatial-temporal data; (d) the set of instructions causing the processor to determine the real-time response variable prediction further causing the processor to determine temporal correlations within the processed real-time fracturing data; and (e) the recurrent neural network including one or more long short-term memory (LSTM) layers. The one or more LSTM layers are arranged in a sequence.

Each of the one or more LSTM layers is configured to perform operations including: (i) receiving a layer input, wherein the layer input is the real-time fracturing data or a layer output generated by a preceding LSTM layer in the sequence; (ii) generating an LSTM output based on the layer input and a previous projected output; and (iii) generating, by processing through the respective LSTM layer, a projected output by applying a matrix of current values of weights to project the LSTM output.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

The invention claimed is:

1. A method for fracturing a formation, the method comprising:
   acquiring real-time fracturing data from a well bore during fracturing operation;
   processing the real-time fracturing data using a recurrent neural network trained using historical data from analogous wells;
   determining a real-time response variable prediction using the processed real-time fracturing data;
   estimating a total number of open perforations in the well bore and tortuosity friction in the well bore based on the determined real-time response variable;
   adjusting fracturing parameters for the fracturing operation in real-time based on the real-time response variable prediction, the estimated total number of open perforations in the well bore, and the estimated tortuosity friction in the well bore; and
   performing the fracturing operation using the fracturing parameters that were adjusted based on the real-time response variable prediction.

2. The method of claim 1, wherein the response variable comprises at least one of a bottomhole pressure of a well bore and temperature of the well bore.

3. The method of claim 1, wherein the real-time fracturing data comprises multidimensional spatial-temporal data.

4. The method of claim 1, wherein the step of determining the real-time response variable prediction further comprises determining temporal correlations within the processed real-time fracturing data.

5. The method of claim 1, wherein the recurrent neural network comprises one or more long short-term memory (LSTM) layers, wherein the one or more LSTM layers are arranged in a sequence, and wherein each of the one or more LSTM layers is configured to perform operations comprising:
   receiving a layer input, wherein the layer input is the real-time fracturing data or a layer output generated by a preceding LSTM layer in the sequence;
   generating an LSTM output based on the layer input and a previous projected output; and
   generating, by processing through the respective LSTM layer, a projected output by applying a matrix of current values of weights to project the LSTM output.

6. The method of claim 5, wherein the recurrent neural network comprises one or more Gated Recurrent Units (GRU) layers arranged in sequence.

7. The method of claim 1, wherein the recurrent neural network comprises LSTM layers and wherein each LSTM layer has weights and biases associated therewith.

8. A system for fracturing a formation, the system comprising:
   a downhole tool having a plurality of sensors thereon configured to acquire real-time fracturing data from a well bore;
   a processor in data communication with the downhole tool; and
   a memory device coupled to the processor, the memory device containing a set of instructions that, when executed by the processor, cause the processor to:
      acquire the real-time fracturing data from the well bore during fracturing operation;
      process the real-time fracturing data using a recurrent neural network trained using historical data from analogous wells;
      determine a real-time response variable prediction using the processed real-time fracturing data;
      estimate a total number of open perforations in the well bore and tortuosity friction in the well bore based on the determined real-time response variable; and
      adjust fracturing parameters for the fracturing operation in real-time based on the real-time response variable prediction, the estimated total number of open perforations in the well bore, and the estimated tortuosity friction in the well bore.

9. The system of claim 8, wherein the response variable comprises at least one of a bottomhole pressure of a well bore and temperature of the well bore.

10. The system of claim 8, wherein the real-time fracturing data comprises multidimensional spatial-temporal data.

11. The system of claim 8, wherein the set of instructions that causes the processor to determine the real-time response variable prediction further causes the processor to determine temporal correlations within the processed real-time fracturing data.

12. The system of claim 8, wherein the recurrent neural network comprises one or more long short-term memory (LSTM) layers, wherein the one or more LSTM layers are arranged in a sequence, and wherein each of the one or more LSTM layers is configured to perform operations comprising:
   receiving a layer input, wherein the layer input is the real-time fracturing data or a layer output generated by a preceding LSTM layer in the sequence;
   generating an LSTM output based on the layer input and a previous recurrent projected output; and
   generating, by processing through the respective LSTM layer, a projected output by applying a matrix of current values of weights to project the LSTM output.

13. The system of claim 8, wherein the recurrent neural network comprises one or more Gated Recurrent Units (GRU) layers arranged in sequence.

* * * * *